Figure 1:
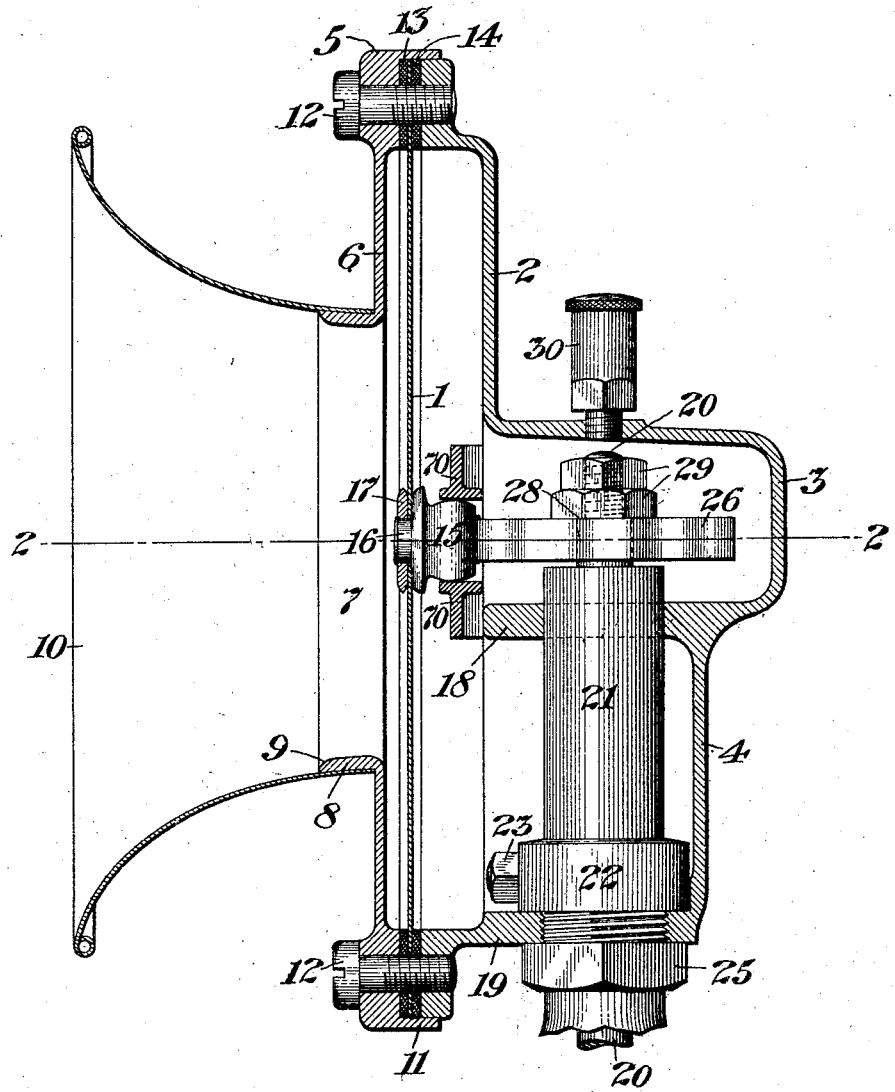

M. R. HUTCHISON.
MECHANICAL HORN AND DIAPHRAGM THEREFOR.
APPLICATION FILED MAY 7, 1909.

1,148,231.

Patented July 27, 1915.
4 SHEETS—SHEET 1.

Witnesses
Chas. J. Clagett

Miller Reese Hutchison Inventor
By his Attorney
G. C. Dean

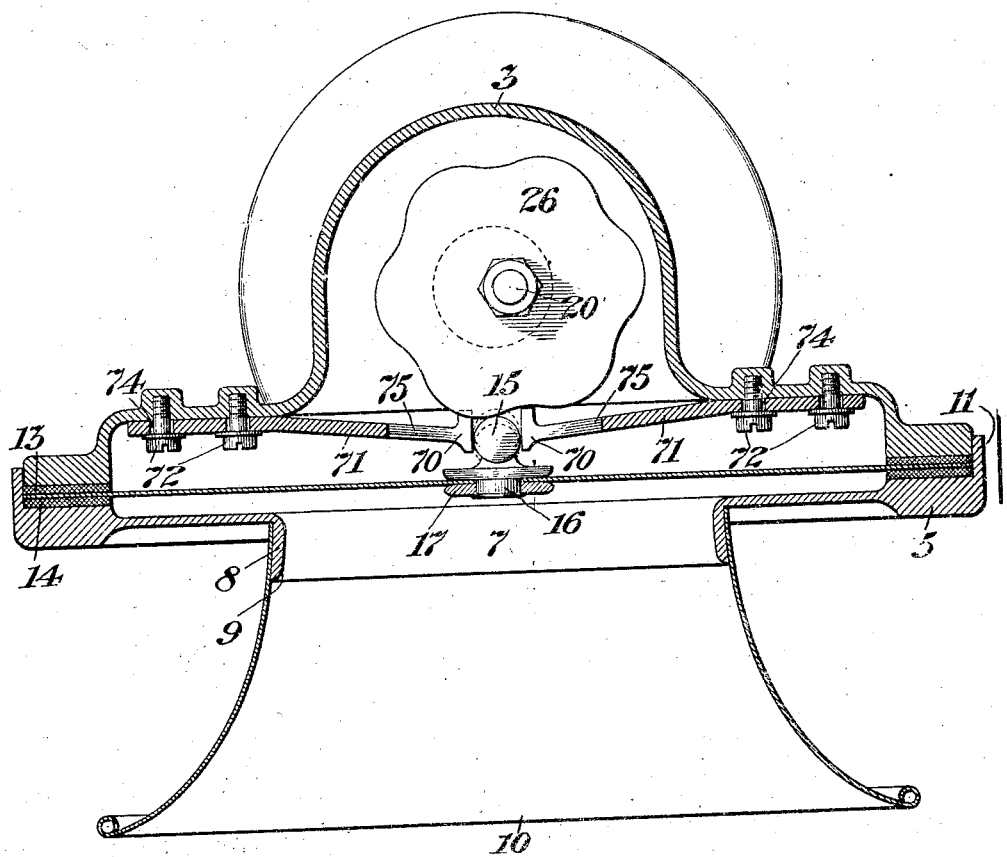

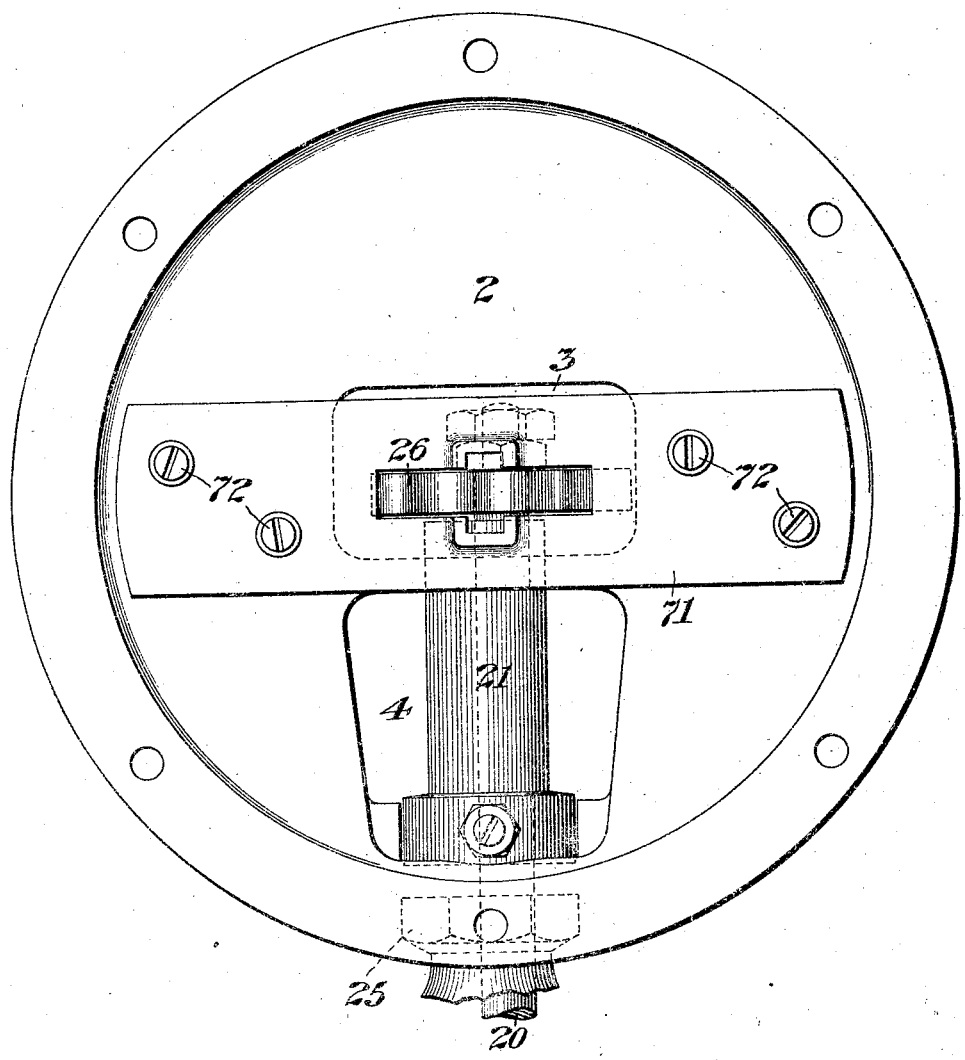

M. R. HUTCHISON.
MECHANICAL HORN AND DIAPHRAGM THEREFOR.
APPLICATION FILED MAY 7, 1909.
1,148,231.
Patented July 27, 1915.
4 SHEETS—SHEET 4.
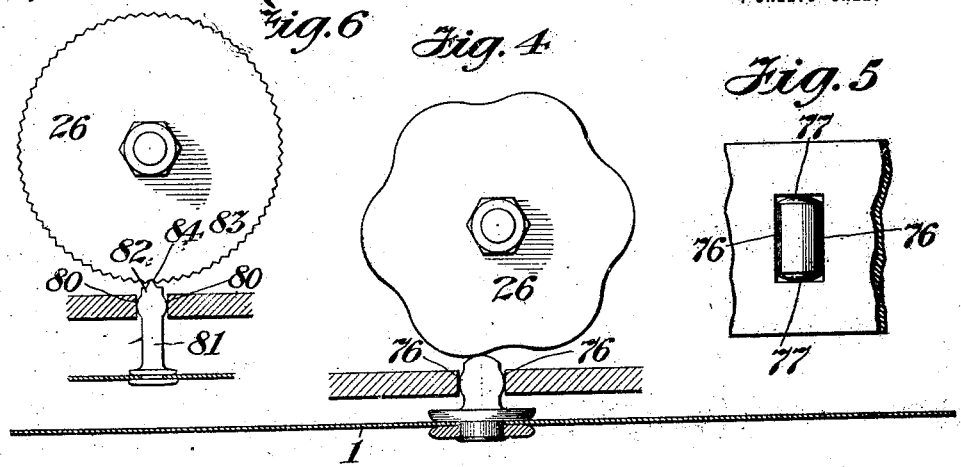
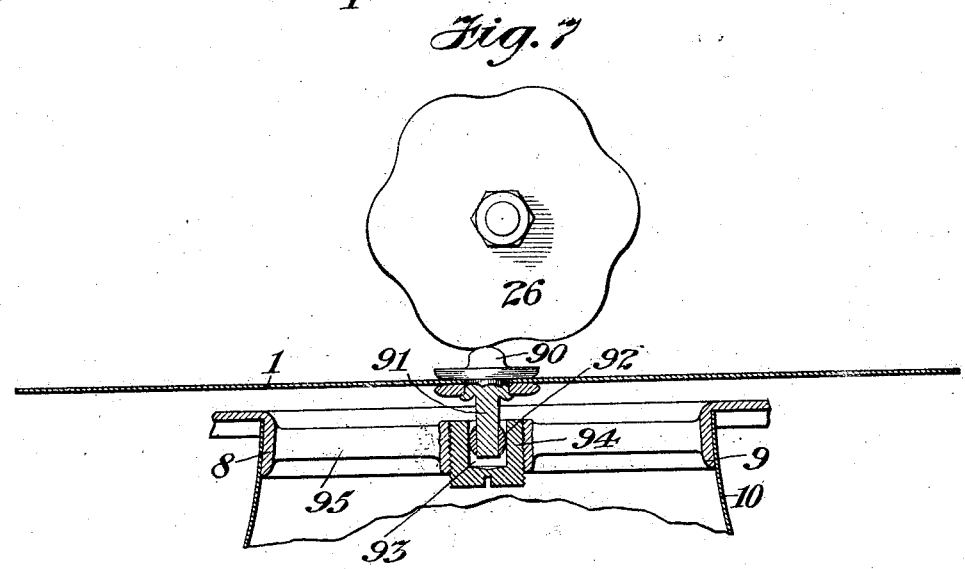

UNITED STATES PATENT OFFICE.

MILLER REESE HUTCHISON, OF SUMMIT, NEW JERSEY, ASSIGNOR TO LOVELL-McCONNELL MANUFACTURING COMPANY, A CORPORATION OF DELAWARE.

MECHANICAL HORN AND DIAPHRAGM THEREFOR.

1,148,231.  Specification of Letters Patent.  Patented July 27, 1915.

Application filed May 7, 1909. Serial No. 494,688.

*To all whom it may concern:*

Be it known that I, MILLER REESE HUTCHISON, a citizen of the United States, and a resident of Summit, in the county of Union and State of New Jersey, have invented certain new and useful Improvements in Mechanical Horns and Diaphragms Therefor, of which the following is a specification.

In my Patent No. 923,049 and in my Patent No. 883,643, I have described the various preferred constructions and operations of a horn wherein the sound is caused by operation of the rotary cam upon an elastic diaphragm. I have also explained certain desirable features of the cam and of a coöperating thrust member or anvil on the diaphragm, whereby lateral tilting of the contact piece and reverse bending of the cam are sought to be avoided. In my Patent No. 923,048, I show and describe, but do not claim, a horn or resonator and a diaphragm, in combination with a rotary member having an eccentric thrust surface, a thrust member driven by said eccentric surface, a guide for confining the motion of said thrust member to a direction perpendicular to the diaphragm, and means for rotating said rotary member so as to displace said thrust member at rates corresponding to the frequency of desired notes to be produced.

My present invention relates to devices of the above type, and particularly concerns the use of a guide for the thrust member of the diaphragm, whereby all possibility of side thrust on the diaphragm is obviated.

One feature of my invention consists in a thrust member or wear piece rigidly attached to the diaphragm in any of the ways contemplated by my various patents and applications, in combination with a lateral guide for preventing displacement or tilting by reason of either friction or lateral thrust of the cam.

Another feature of my invention consists in shaping the free end of the wear piece on the diaphragm so that it is impossible for it to bind or become cocked in the guide.

In the drawings, Figures 1, 2, and 3 show the invention as applied to an alarm or signaling device of the general construction disclosed in my application Serial No. 494,120; Fig. 1 being a vertical section through the case and diaphragm; Fig. 2, a transverse section of the line 2, 2, Fig. 1; and Fig. 3 being a face view of the rear section of the diaphragm case showing the cam and guide with the diaphragm and front section of the case removed; Fig. 4 is a detail view showing a modified form of wear piece and guide; Fig. 5 is a detail plan view showing the wear piece and guide of Fig. 4; Fig. 6 is a detail view of a modified form of rotary cam and wear piece; and Fig. 7 is a detail view of a modified arrangement of guide for the wear piece applied on the resonator side of the diaphragm.

The diaphragm 1 is clamped at the edges between two sections of an inclosing case. The rear section 2 is formed with rear walls approximately parallel with the diaphragm, except where it is enlarged, as at 3 and 4, to form inclosing chambers for the cam, cam shaft, and bearings. The front face is formed with an annular clamping surface 5. The front cover or resonator section 6 of the diaphragm case is parallel with the diaphragm and far enough away from it to permit maximum vibration of the diaphragm without engagement with the case. It is formed with the central opening 7 of large diameter so as to expose a large part of the effectively vibrating part of the diaphragm. The opening is surrounded by an annular flange 8, which may be flared toward the open end, as indicated at 9. The resonator 10 is secured to this flange preferably by spinning the material against the outer wall thereof or by brazing or by both. The periphery of front section 6 is formed with a flange 11 fitted over the rear section 2 of the diaphragm case. As shown in the drawings, the clamping surfaces are of ample width and thickness to apply the clamping pressure of the screws 12 evenly about the periphery of the diaphragm. The quality of the note is improved and destructive vibration and cutting action of the diaphragm is prevented by washers 13 and 14 arranged between the diaphragm and the clamping faces of each section of the case. These washers may be of non-vibratory material, such as cork, wood, or hardened fiber.

The diaphragm 1 is provided with a wear piece 15 formed with a shank 16 riveted over a washer 17. This wear piece operates as a thrust member to apply the power of the cam to the diaphragm. It is somewhat similar to the wear piece or anvil described in my prior Patent No. 883,643, but is preferably modified for purposes of the present invention in particulars hereinafter set forth.

The section 2 of the diaphragm case is formed with webs 18, 19, having alined openings for support of the cam shaft 20. The latter is mounted in a bearing sleeve 21 with its axis eccentric to but preferably parallel with the axis of said bearing 21, as shown more clearly in Figs. 2 and 3. When said bearing is rotated, the axis of the shaft moves in a circular path approximately parallel with the axis of the sleeve. In practice, I find that the radius of this eccentricity need not be much greater than the amplitude of vibration of the diaphragm, in order to give a throw amply sufficient for all required adjustments of the power shaft with respect to the diaphragm.

The sleeve bearing 21 is held in a desired position of longitudinal adjustment by means of the screw collar 22 engaging the end wall of the casing. This collar is locked in position by means of a screw key 23, screw threaded into collar 22 and having a stud engaging a recess in sleeve 21. There is a coöperating lock nut 25 outside of the casing which may be loosened to permit rotary adjustment of the sleeve bearing 21 and the cam shaft 20 carried thereby and which may be tightened to rigidly clamp said bearing against both longitudinal and rotary movement.

The power shaft 20 is operatively arranged to vibrate the diaphragm preferably through the medium of a rotary member 26, having eccentric surfaces adapted to apply the power of the shaft to displace the thrust member which in turn displaces the diaphragm to cause the desired vibratory movements thereof. The eccentric surfaces on the rotary member, as shown, are peripherally arranged cam surfaces, though it is obvious that I may use other equivalent eccentric surfaces, such as shown in my prior Patent No. 923,048.

The cam 26 is rigidly secured to the cam shaft 20 in any desired way and is prevented from endwise displacement therefrom by lock nuts 29.

Oil for lubricating the shaft 20 and also the contact between cam 26 and wear piece 15, is supplied through an oil passage or reservoir 30. Part of the oil is thrown by centrifugal force from the rapidly revolving cam against the thrust member 15.

My invention, as applied to the above construction, includes lateral guides 70, 70, on one or both sides of the thrust member or anvil to prevent lateral tilting thereof. These guides are formed as part of a bridge piece 71 secured to the face of the casing by screws 72, 72. Provision for adjustment of the position of the guide is made by having the holes 74 somewhat larger than the shanks of the screws 72. The vertical surfaces of the guides 70 and the amount of projection of the anvil or wear piece from the diaphragm, are so proportioned that the latter may vibrate freely without danger of striking the guides. The guides and adjacent portions of the supporting bridge piece are preferably cut away, as at 75, 75, to permit necessary adjustment of the cam, without danger of contact with the guide or guide supports.

In order to prevent the possibility of the thrust member from sticking or becoming jammed in the guides, the faces presented in the direction of rotation of the cam are formed on symmetrical arcs having the same center and equal radii. It will be obvious that the surfaces formed on such arcs may be a sphere, though I prefer to make them cylindrical, as shown in Fig. 1, since a cylinder gives an ample extent of straight line contact better adapted to withstand wear. The ends of the thrust member are preferably cut along the surfaces of a cylinder having an axis passing through the axis of said first mentioned cylinder at right angles thereto. The length of the radius of the side thrust surfaces bears no necessary relation to the length of the radius of the end surfaces, the essential being that the sides and ends of the thrust member fit the guide through the limited range of angular displacement which is likely to occur during vibrations of the diaphragm.

In Figs. 1 and 2, the top surface of the thrust member, where it is engaged by the rotary cam, is formed on an arc of the same radius and having the same center as that of the side thrust surfaces. This is not necessary, as will be evident from Figs. 4 and 5. In the latter figures, the side cylindrical surfaces 76, 76 are formed as a mere enlargement of the shank of the thrust member. In Fig. 5 the end surfaces 77, 77, of the thrust member are formed as symmetrical portions of the surface of the same sphere.

Where my invention is used, the cam engaging end of the thrust member is prevented from lateral displacement and hence no reverse bending stress is applied to the diaphragm. Under such conditions, it is unnecessary to proportion the altitude of the thrust member to its base for the purpose of making the lines of thrust of the cam fall within the base of the thrust member where it engages the diaphragm. In fact, there are certain advantages in elongating the thrust member, as indicated in Fig. 6. This figure illustrates the principle that the cylindrical guide surface 80 is in effect a sliding fulcrum of a lever, of which the long portion 81 of the thrust member is the weight arm and the shorter portion 82 is the power arm. Hence, the longer the part 81 is in proportion to the length of 82, the less will be the lateral effect upon the diaphragm of side thrust of the cam teeth 83 on the point or edge 84. This makes possible the use of cam teeth 83 and wear surface 84, of relatively steep pitch.

In Fig. 7, the upper portion 90 of the thrust member is of any known or desired form, and lateral tilting is prevented by extending a shank 91 from the front side of the diaphragm. The latter is provided with a spherical surface 92 engaging a recess 93 in a screw plug 94 adjustably held in a bridge 95 spanning the mouth of the resonator.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the devices and of its operation, may be made without departing from my invention.

I claim:

1. In an alarm or signaling apparatus of the class described, a horn or resonator, and a diaphragm in combination with a rotary cam having a plurality of cam projections spaced apart and means for rotating it at high speed, the speed of rotation and the configuration of the cam projections being such as to mechanically and positively force outward movement of the diaphragm at such velocity as to cause further outward movement of the diaphragm in the same direction by momentum against increasing elastic stress and to permit free inward movement of the diaphragm to a predetermined distance on the other side of normal, a thrust member carried by the diaphragm driven by the cam and a guide for the free end of said thrust member.

2. In an alarm or signaling apparatus of the class described, a horn or resonator and a diaphragm, in combination with a rotary cam, a thrust member secured to said diaphragm and driven by said cam, a guide passage for confining the motion of said thrust member to a direction perpendicular to the diaphragm, said thrust member being formed with curved lateral bearing surfaces for engagement with said guide, the radii of curvature of said surfaces corresponding to the radii of arcs of circles, having the same diameter as said passage, for the purpose described.

3. In an alarm or signaling apparatus of the class described, a horn or resonator and a diaphragm, in combination with a rotary cam, a thrust member secured to said diaphragm and driven by said cam, a guide for confining the motion of said thrust member to a direction perpendicular to the diaphragm, said thrust member being formed with similar curved lateral bearing surfaces for engagement with said guide, said surfaces being similar to each other in curvature and having the same centers.

4. In an alarm or signaling apparatus of the class described, a horn or resonator and a diaphragm, in combination with a rotary cam, a thrust member secured to said diaphragm and driven by said cam, a guide passage for confining the motion of said thrust member to a direction perpendicular to the diaphragm, said thrust member being formed with similar concentric cylindrical lateral bearing surfaces for engagement with said guide, the radii of curvature of said surfaces corresponding to the radii of arcs of circles, having the same diameter as said passage, for the purpose described.

5. In an alarm or signaling apparatus of the class described, a horn or resonator and a diaphragm, in combination with a rotary cam, a thrust member secured to said diaphragm and actuated by said cam, and a guide for confining the motion of said thrust member to a direction perpendicular to the diaphragm, said thrust member having lateral bearing surfaces which engage surfaces on the guide and which are convex with relation to the engaged guide surfaces.

6. In an alarm or signaling apparatus of the class described, a horn or resonator and its diaphragm, in combination with a rotary cam, a thrust member secured to the diaphragm and actuated by said cam and a guide for confining the motion of the thrust member to a direction perpendicular to the diaphragm, said thrust member being wider than the cam, so that the ends of the guides will prevent tilting of the thrust member, without the necessity of having the thrust member projecting beyond the guides.

Signed at New York city, in the county and State of New York, this fourth day of May, A. D. 1909.

MILLER REESE HUTCHISON.

Witnesses:
GEORGE C. DEAN,
IRVING M. OBRIEGHT.